United States Patent
Todd et al.

(10) Patent No.: US 12,306,951 B2
(45) Date of Patent: May 20, 2025

(54) SECURE ENCLAVE PATHING CONFIGURATION FOR DATA CONFIDENCE FABRICS

(71) Applicant: EMC IP Holding Company LLC, Hopkinton, MA (US)

(72) Inventors: Stephen J. Todd, North Andover, MA (US); Kenneth Durazzo, Morgan Hill, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 645 days.

(21) Appl. No.: 17/084,325

(22) Filed: Oct. 29, 2020

(65) Prior Publication Data

US 2022/0138325 A1    May 5, 2022

(51) Int. Cl.
| | |
|---|---|
| *G06F 21/57* | (2013.01) |
| *G06F 9/54* | (2006.01) |
| *G06F 11/34* | (2006.01) |
| *G06F 21/54* | (2013.01) |

(52) U.S. Cl.
CPC ............ *G06F 21/575* (2013.01); *G06F 9/542* (2013.01); *G06F 11/3409* (2013.01); *G06F 21/54* (2013.01); *G06F 21/577* (2013.01); *G06F 2221/2101* (2013.01)

(58) Field of Classification Search
CPC .... G06F 21/575; G06F 9/542; G06F 11/3409; G06F 21/54; G06F 21/577; G06F 2221/2101
See application file for complete search history.

(56) References Cited

U.S. PATENT DOCUMENTS

| | | | |
|---|---|---|---|
| 9,727,591 B1* | 8/2017 | Sharma | G06F 8/71 |
| 10,404,757 B1* | 9/2019 | Horton | H04L 67/02 |
| 10,855,619 B1* | 12/2020 | Andrews | H04L 63/20 |
| 10,986,076 B1* | 4/2021 | Bendickson | H04L 63/1408 |
| 11,416,619 B1* | 8/2022 | Paczkowski | G06F 21/575 |
| 2006/0294151 A1* | 12/2006 | Wong | G06Q 30/02 |
| 2010/0031027 A1* | 2/2010 | Thomas | H04L 9/3265 |
| | | | 713/156 |
| 2010/0144517 A1* | 6/2010 | Kordas | G01C 21/367 |
| | | | 564/470 |
| 2010/0281273 A1* | 11/2010 | Lee | F04B 33/00 |
| | | | 713/193 |

(Continued)

OTHER PUBLICATIONS

Steve Todd, IoT Data Confidence Fabrics, May 30, 2019, https://stevetodd.typepad.com/my_weblog/2019/05/iot-data-confidence-fabrics.html (Year: 2019) (Year: 2019).*

(Continued)

*Primary Examiner* — Saleh Najjar
*Assistant Examiner* — Devin E Almeida
(74) *Attorney, Agent, or Firm* — Workman Nydegger (57) ABSTRACT

One example method includes performing a secure boot of hardware at a node of a data confidence fabric, creating an artifact that includes information concerning the secure boot, storing the artifact, receiving a data stream at the node, annotating data of the data stream with trust metadata, and associating the artifact with the data. An immutable ledger entry may be created that includes a pointer to the data, and a pointer to the artifact, and the immutable ledger entry may be accessible by an application.

20 Claims, 10 Drawing Sheets

(56) References Cited

U.S. PATENT DOCUMENTS

| | | | | |
|---|---|---|---|---|
| 2014/0126573 | A1* | 5/2014 | Matthews | H04L 41/344 370/389 |
| 2014/0126576 | A1* | 5/2014 | Kumagai | H04L 61/103 370/392 |
| 2015/0058278 | A1* | 2/2015 | Fankhauser | G06F 16/2365 707/602 |
| 2016/0070932 | A1* | 3/2016 | Zimmer | G06F 21/53 713/192 |
| 2017/0177873 | A1* | 6/2017 | Raghuram | G06F 21/53 |
| 2017/0364683 | A1* | 12/2017 | Willden | G06F 12/14 |
| 2018/0182052 | A1* | 6/2018 | Panagos | G06F 21/604 |
| 2018/0211034 | A1* | 7/2018 | Costa | G06F 9/45558 |
| 2019/0121979 | A1* | 4/2019 | Chari | G06F 21/566 |
| 2019/0139576 | A1* | 5/2019 | Delaney | G06V 20/46 |
| 2019/0361929 | A1* | 11/2019 | Rogynskyy | G06F 16/9035 |
| 2020/0304318 | A1* | 9/2020 | Kravitz | H04L 9/3268 |
| 2021/0133349 | A1* | 5/2021 | Jensen | G06F 16/215 |
| 2021/0158074 | A1* | 5/2021 | Wray | G06F 16/90335 |
| 2022/0126864 | A1* | 4/2022 | Moustafa | G06T 1/0007 |

OTHER PUBLICATIONS

P. L. Rupasinghe, H. H. Weerasena and I. Murray, "Trustworthy provenance framework for document workflow provenance," 2016 International Conference on Computational Techniques in Information and Communication Technologies (ICCTICT), 2016, pp. 168-175, doi: 10.1109/ICCTICT.2016.7514573. (Year: 2016) (Year: 2016).*

T. F. J. -. Pasquier and D. Eyers, "Information Flow Audit for Transparency and Compliance in the Handling of Personal Data," 2016 IEEE International Conference on Cloud Engineering Workshop (IC2EW), 2016, pp. 112-117, doi: 10.1109/ICZEW.2016.29. (Year: 2016) (Year: 2016).*

Cappiello et al . . . Data Ecosystems: Sovereign Data Exchange among Organizations, Feb. 19, 2020, Dagstuhl Reports, vol. 9, Issue 9, pp. 66-134, 10.4230/DagRep.9.9.66 (Year: 2020) (Year: 2020).*

* cited by examiner

SECURE ENCLAVE PATHING CONFIGURATION FOR DATA CONFIDENCE FABRICS

FIELD OF THE INVENTION

Embodiments of the present invention generally relate to data confidence fabrics (DCF). More particularly, at least some embodiments of the invention relate to systems, hardware, software, computer-readable media, and methods for evaluating and ensuring the trustworthiness of DCF metadata and trust metadata such as confidence scores.

BACKGROUND

A Data Confidence Fabric (DCF) annotates and scores the data that flows within it. A DCF may enable an application or user to measure data trustworthiness and thus acquire a level of confidence as it is processed by analytic frameworks and managed by data governance tools. However, this functionality is built on the assumption that DCF scores and other metadata, generated by the DCF, are themselves trustworthy. That may not always be the case however.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data confidence fabrics (DCF). More particularly, at least some embodiments of the invention relate to systems, hardware, software, computer-readable media, and methods for evaluating and ensuring the trustworthiness of DCF metadata and trust metadata such as confidence scores.

A DCF according to some example embodiments of the invention may enable a significant increase in data confidence through the use of secure enclave technology. Thus, some example embodiments embrace mechanisms for combining secure enclave technology into a DCF. In general, example embodiments of a DCF may employ a protected memory space, such as a secure enclave for example, that has been pre-populated with elements that facilitate secure DCF annotation and forwarding. Such embodiments may also employ a DCF container that has undergone a secure boot that enables access to the DCF protected memory space. The protected memory space and DCF container may operate to create a trusted DCF metadata inheritance path that may avoid or eliminate various problems.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that any one or more of the various problems noted herein may be avoided, or eliminated. As another example, an embodiment may help to ensure the trustworthiness of information generated by the DCF itself, such as DCF metadata, and trust metadata such as confidence scores. An embodiment of the invention may provide for an audit path to verify processes performed by the DCF.

A. Overview and Example Operating Environment

Figure 1:
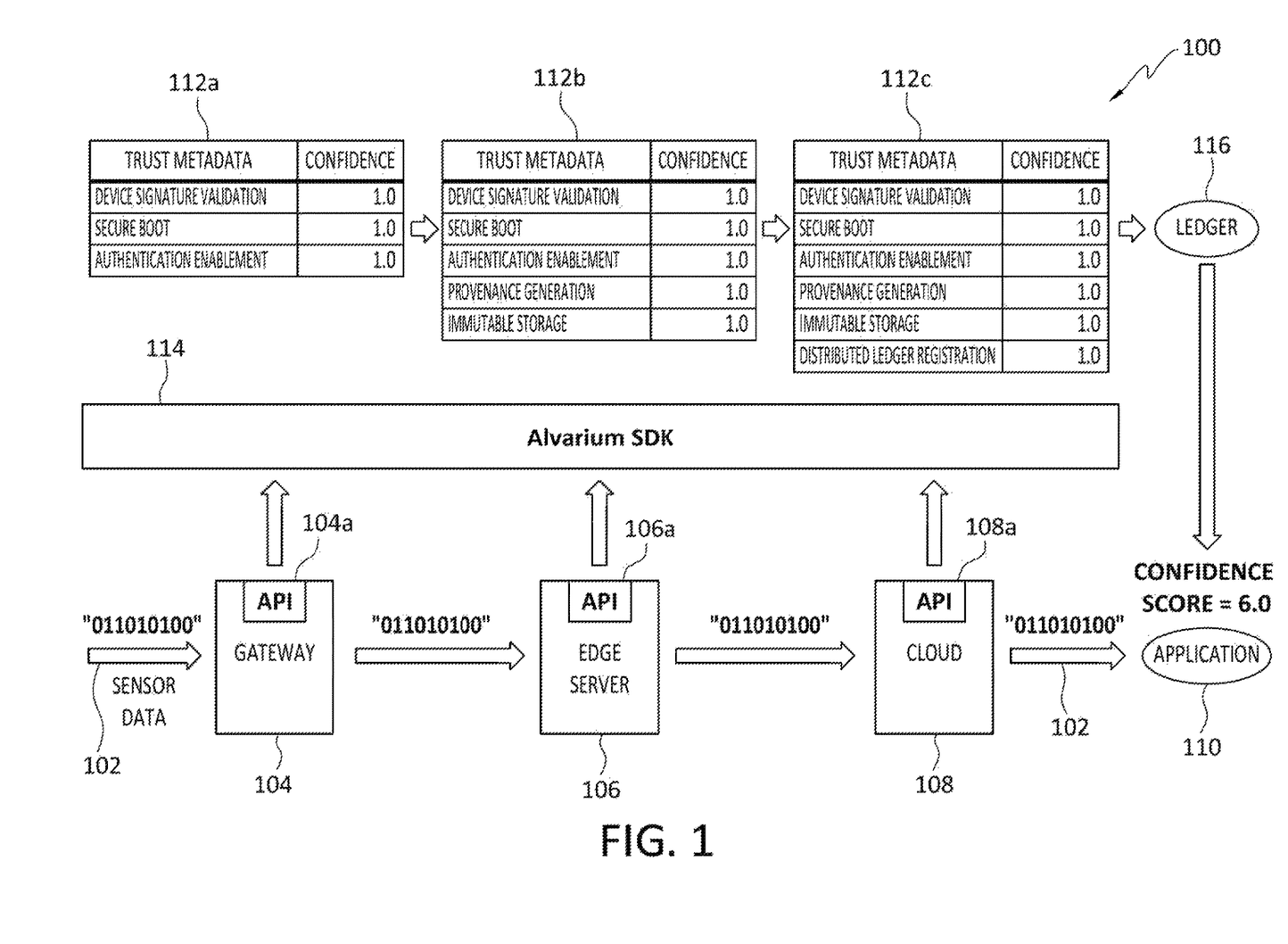
FIG. 1 discloses aspects of annotation and scoring of edge (IoT) data.

With reference now to FIG. 1, embodiments of the invention may be implemented in a variety of operating environments, one example of which is a DCF denoted at 100 in FIG. 1. In general, the DCF 100 may annotate and score any data that flows within it, providing increased confidence to the applications that use that data, such as for analytical purposes for example.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Moreover, example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As shown in FIG. 1, the particular DCF 100 concerns the context of edge-based use cases, but the scope of the invention is not limited to such cases or contexts. As shown in FIG. 1, data such as sensor data 102 generated by a sensor flows through one or more tiers, or layers, of the DCF. In the illustrated example, the data 102 may flow through nodes such as a gateway 104, edge server 106, and cloud ecosystem 108, and may ultimately be consumed by one or more applications 110. As trusted handling of the data 102, at the nodes of the various layers, occurs during data 102 delivery, respective trust metadata 112a, 112b, and 112c may be associated with the data 102 by those nodes, that is, by the gateway 104, edge server 106, and/or, cloud ecosystem 108. Thus, trust metadata may continue to accumulate as the data 102 passes through the various nodes in its path.

The trust metadata 112a, 112b, and 112c, may comprise, for example, respective confidence scores associated with trust insertion processes performed by the nodes with respect to the data 102. The trust metadata 112a, 112b, and 112c may be associated with the data 102 by respective node APIs (Application Program Interfaces) 104a, 106a, and 108a that communicate with an interface 114 such as an Alvarium SDK (Software Development Kit). After the data 102 has transited the various nodes, the final, comprehensive trust metadata 112c may be entered into a ledger 116 which may make the trust metadata 112c available for use by the applications 110. Note that, in this example, the trust metadata 112c is an accumulation of all the trust metadata respectively added by the gateway 104, edge server 106, and cloud ecosystem 108.

To illustrate with reference to the specific example of FIG. 1, the gateway 104 may annotate, to the data 102, respective trust metadata 112a for each of three different operations. Particularly, the gateway 104 may annotate trust metadata 112a that indicates, among other things: the gateway 104 has successfully validated the signature coming from the device that generated the data 102; the gateway 104 has used a TPM chip to confirm that the BIOS, firmware, or O/S on the gateway 104 was tampered with during boot; and, the gateway 104 is currently running authentication/authorization software to protect the data 102 stream from unwanted inspection or access. With continued reference to the trust metadata, including the trust metadata 112a, a Confidence score of "1.0" means that a trust insertion process, such as the secure boot confirmation for example, operation succeeded, while a score of "0," example, might indicate that signature validation failed, or was not performed for some reason.

As noted earlier, the DCF metadata, that is, the trust metadata 112a, ultimately arrives at the ledger 116, where a ledger entry may be created that permanently records the contents of the trust metadata 112a table as well as an overall Confidence Score, which is 6.0 in this illustrative example. Note that the equation used to calculate the Confidence Score in the example of FIG. 1 is simply a summation of confidence scores, but other approaches to calculating an overall Confidence Score may alternatively be employed.

A useful aspect of the example DCF 100 is that, as a result of the annotation of trust metadata 112a, 112b, and 112c, the application 110 may have access to additional context about the trustworthiness of the data 102, addressing the problem of potentially untrustworthy or malicious data sources. The problems presented by such data sources is increasingly faced by enterprise customers as they move their business logic closer to non-enterprise, and potentially untrustworthy, data sources at the edge and/or elsewhere. In the example DCF 100, the path of the data 102 may be largely software-dependent, in the sense that data path handling software, which may comprise a respective instance at each of the gateway 104, edge server 106, and cloud ecosystem 108, may call an annotation/scoring API 104a, 106a, and 108a, respectively, and routing software may be provided at these nodes that forwards the annotations along the data path. However, such software dependencies in a DCF, such as the DCF 100 for example, may lead to vulnerabilities in the trustworthiness of the actual DCF metadata, that is, the trust metadata 112a, 112b, and/or 112c, for example. Examples of such potential vulnerabilities are described below.

Figure 2:
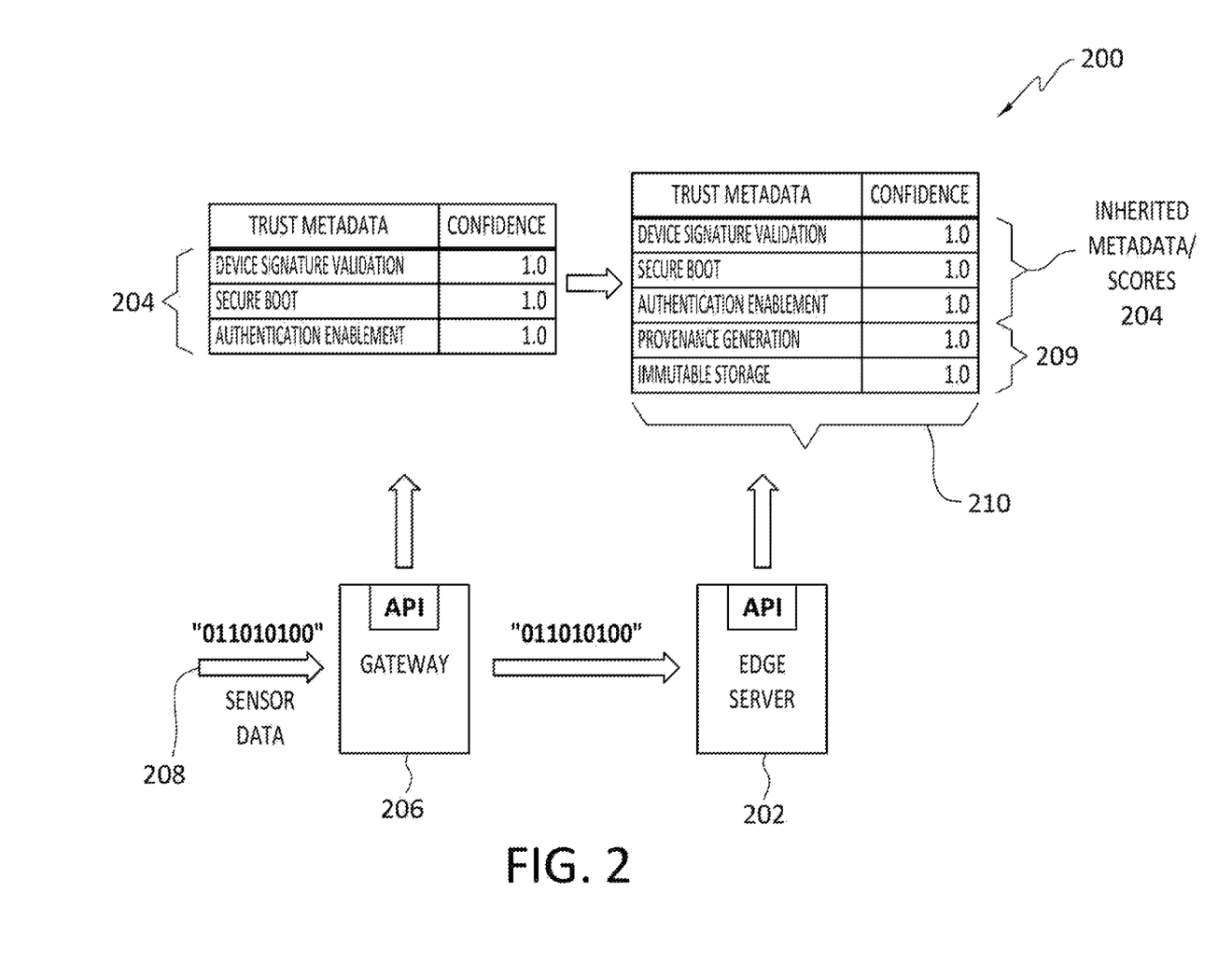
FIG. 2 discloses aspects of metadata inheritance along a DCF path.

With reference now to the example scheme 200 in FIG. 2, and with the discussion of FIG. 1 in view, some details are provided concerning examples of problems and conditions that may be resolved, in whole or in part, by one or more embodiments of the invention. It is noted however, that no embodiment is required to resolve, whether in whole or in part, any of such problems or conditions.

As noted herein, a useful aspect of a DCF is that an application may assess the trustworthiness of a data stream by consulting DCF metadata and scores. However, problems may arise if the DCF metadata and scores themselves are not trustworthy.

A first example of such a problem concerns what may be referred to as inheritance uncertainty. As shown in FIG. 2, a DCF node 202 may inherit trust metadata 204 from another DCF node 206 that handled data 208 of a data stream. In the particular example of FIG. 2, the respective trust metadata 204 concerning Device Signature Validation, Secure Boot, and Authentication Enablement, are inherited by the DCF node 202 from the DCF node 206. In more detail, the node 206, such as a gateway, has annotated the data 208, which may be sensor data, with trust metadata 204, and passed the trust metadata 204 to the next node 202 in the data path. The node 202, which may be an edge server, inherits these annotations from the node 206, implicitly trusts these annotations, and appends additional DCF metadata 209 regarding the trusted handling of the data 208. The node 202 may then forward trust metadata 210, which includes the inherited trust metadata 204 and the added DCF metadata 209, to the next node in the chain, and the last node in the chain may inherit all of the trust metadata appended by the nodes upstream of the last node.

However, while the node 202 inherits trust metadata 204 from the node 206, it may be difficult, or impossible, for the node 202 to verify the authenticity of the inherited trust metadata 204. Various approaches might be considered to address such circumstances.

For example, one approach might be to configure the preceding node, node 206 in this example, with a unique identity that is associated with a private/public key pair. Such an approach may have drawbacks. For example, identity/key pair management in a DCF may be complex to implement and run. As noted herein, embodiments of a DCF may be particularly useful in complex edge configurations that employ a large number of data generators, such as IoT (Internet of Things) devices. Applications processing the data flowing from of IoT devices such as sensors, and hundreds of gateways, need assurance that the data generated by the IoT devices is trustworthy. However, attempting to manage identity and key pairs across such a large, decentralized ecosystem, in order to achieve a level of trust in the annotations made by the DCF nodes, is fraught with difficulties, due at least in part to the frequent failures and reconfigurations of the data generators that occur as the system operates over time.

An identity/key approach to verification of inherited trust metadata may be problematic for other reasons as well, some of which relate to stolen identities and/or keys in a DCF. For example, if a nefarious actor were able to hijack or steal identities or keys on any given DCF node, that actor might gain the ability to generate counterfeit DCF annotations. Such counterfeit annotations, were they to go undetected, could lead an application to mistakenly operate on untrustworthy data that is presumed by the application to be trustworthy. As well, counterfeit annotations may lead an application to reject, as untrustworthy, data that is actually trustworthy.

Another example of a problem to which one or more embodiments may be directed concerns the lack of visibility into DCF node construction provenance. For example, and with continued reference to FIG. 2, the node 206 indicates that it went through a secure boot process, as shown by the trust metadata 210. This level of detail, however, may be insufficient to enable a definitive conclusion to be drawn as to whether or not the actual DCF software itself, that is, the DCF software at the nodes 202 and 206 that performed the trust insertion process on the data 208, went through a similar type of secure boot process. Without detailed provenance describing, for example, DCF software boot details, the next node in the chain, such as the node 202 in the example of FIG. 2, faces uncertainty as to whether, and how, the processing, analysis, and forwarding, of inherited DCF metadata and scores, should proceed.

Another problem that could arise in a DCF concerns DCF node failures and automatic re-routing. Particularly, if a given node in a DCF fails, an administrator may wish to configure the system such that an alternate DCF node is available to participate in metadata/scoring generation and forwarding. However, the use of a new node within the chain may provide an opportunity for untrustworthy annotation of data passing through the node, which might occur either accidentally or due to the malicious action of a bad actor.

Finally, another problem that may be encountered is that a DCF may suffer from a lack of forensic auditability for trusted path traversal. Particularly, and in view of problems such as those just noted, a DCF may lack the capability to perform a forensic check on the trustworthiness of the DCF annotators that existed for any given data set. That is, if any given node in a DCF chain cannot fully trust the annotations that were generated previously by another node or nodes, then an overall forensic scan of the final DCF metadata state would be unable to validate the strength of the entire chain that was used at the time of original data handling.

B. Aspects of Some Example Embodiments

Among other things, some example embodiments may serve to leverage the use of secure enclave technology to enable the construction of more highly-trusted data confidence fabrics. One example implementation is disclosed in FIG. 3.

Figure 3:
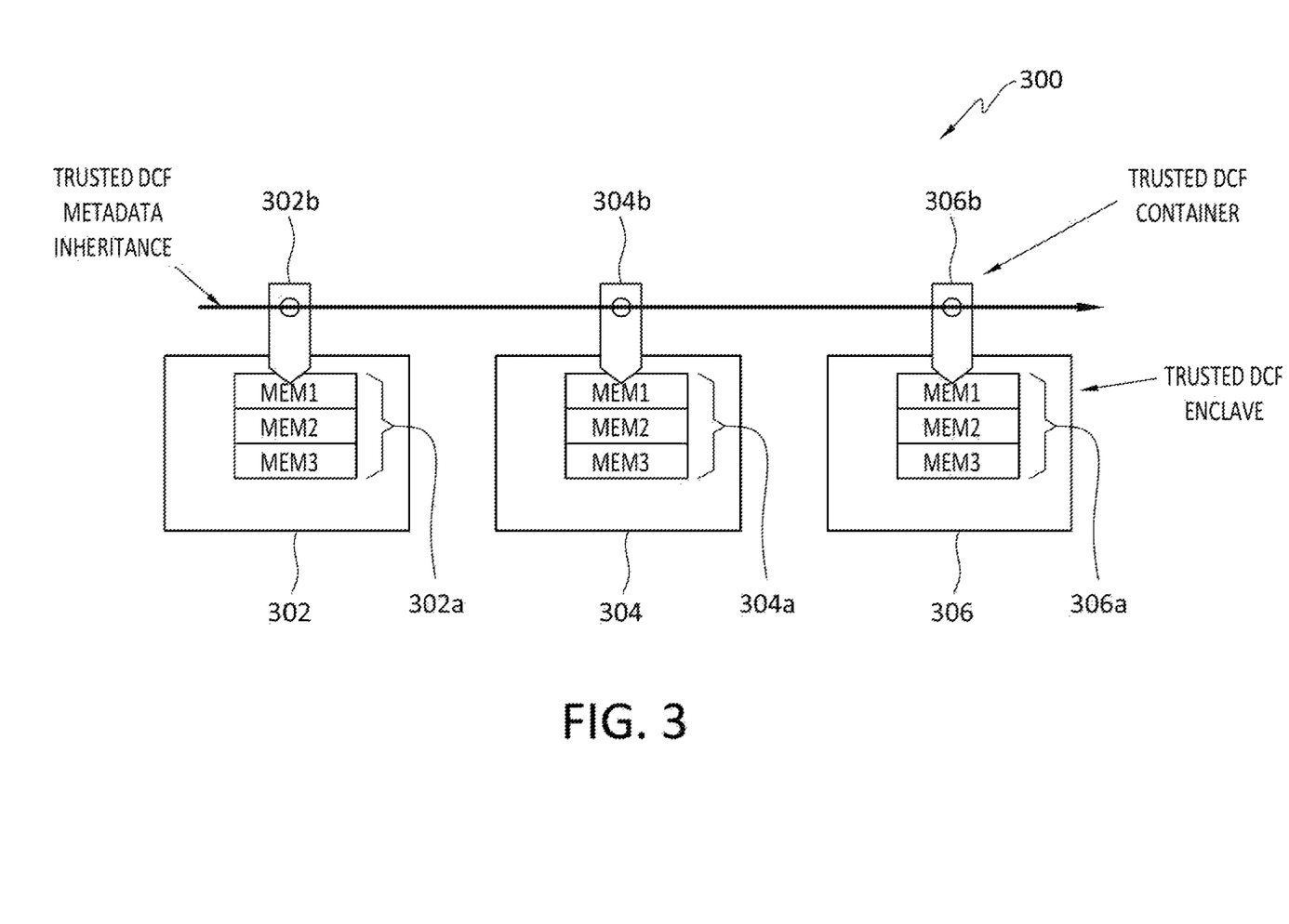
FIG. 3 discloses aspects of secure enclave pathing for trusted DCF annotation and forwarding.

In the example configuration 300 in FIG. 3, nodes 302, 304, and 306, may each include, or otherwise be associated with, a respective protected memory space 302a, 304a, and 306a, such as secure enclave hardware for example, that has been pre-populated with elements that may serve to facilitate secure DCF trust metadata annotation, and secure trust metadata forwarding, by the node. As well, the nodes 302, 304, and 306, may further include, or otherwise be associated with, a respective DCF container 302b, 304b, and 306b, that has undergone a secure boot that enables access to the respective DCF protected memory spaces 302a, 304a, and 306a. In general, the protected memory spaces and DCF containers may operate to create a trusted DCF metadata inheritance path. Embodiments of such a trusted DCF metadata inheritance path may be effective in addressing one or more of the problems disclosed herein. Further details concerning aspects of example embodiments are described below.

One such aspect of some example embodiments is the creation/deployment of a trusted DCF annotation stack. Particularly, in order to build a trusted, secure path for DCF annotations/metadata/scores, the deployment of hardware, such as gateways, edge servers, and cloud infrastructures for example, into the data path may include a pre-initialized protected memory space in the deployed hardware, along with the DCF container that has already been built and installed onto that hardware. Thus, the hardware may already be configured for the creation and handling of trusted DCF metadata at the time that the hardware is installed in a data path of the DCF. Alternatively, the hardware may be so configured after it is installed in a data path of the DCF.

In general, in order for a device at a DCF node to achieve a trusted status with respect to the trust metadata that it inherits, and with respect to the trust metadata that the device creates and annotates to a data stream, the device may be required to perform a secure boot process, and the device may also be required to demonstrate that the secure boot process has been satisfactorily performed.

Figure 4:
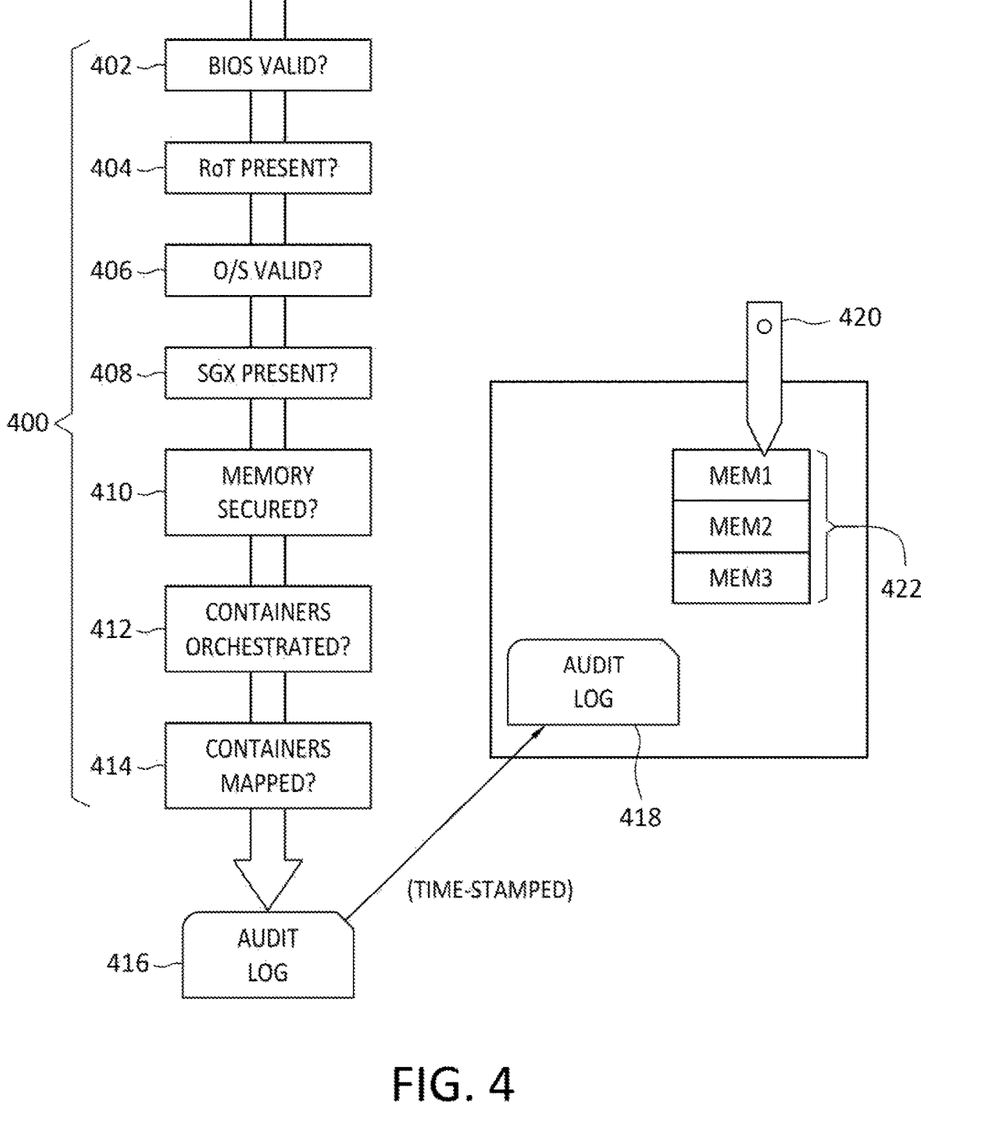
FIG. 4 discloses an example process for creation of a DCF secure boot provenance artifact.

With reference now to FIG. 4, the secure boot process may be represented as a trusted DCF annotation stack 400 that may comprise various validation, logging, and/or, other, processes. The processes indicated in the DCF annotation stack 400 may be performed by DCF node software running at a DCF node. It is noted that the processes included in the DCF annotation stack 400 may, but need not, be performed in the indicated order. In other embodiments, those processes may be performed in a different order. As well, some of the processes in the DCF annotation stack 400 may be performed simultaneously and/or may be performed in an overlapping manner with respect to each other. Finally, performance of the processes in the DCF annotation stack 400 may be memorialized so as to create an audit trail that can be used to perform audits as to whether, how, and when, for example, the individual processes, and the overall boot process, were performed.

As such, performance of the processes in the DCF annotation stack 400 may be referred herein to as the auditable boot orchestration of a trusted DCF annotation stack. In the example of FIG. 4, the DCF annotation stack 400 may comprise various processes that collectively define a secure boot process performed by the node hardware that would be authorized to perform secure annotation of trust metadata upon successful completion of a secure boot process. That is, the DCF annotation stack 400 may define a secure boot process.

Such processes that make up a secure boot process, and may be performed by node hardware, may include, for example: validate and log BIOS (Basic Input/Output System) is present in the node hardware 402; validate and log RoT (Root of Trust) in the node hardware 404, that is, the first piece of code in the DCF annotation stack 400 that has been verified as legitimate and that may start a chain of trust which ensures the node hardware is booting with legitimate code; validate and log proper version of O/S (Operating System) on the node hardware 406, such as LINUX for example; validate and log secure enclave is present in the node hardware 408, such as Intel SGX (Software Guard Extensions) usable to partition sensitive information into enclaves in memory areas that have enhanced security protection; validate and log that contents of secure memory, that is, the enclave(s), are intact 410; validate and log orchestration of secure/executable containers 412, which may be pre-installed in the secure memory, to ensure that the secure memory and containers have not been tampered with; and, validate and log proper mapping of secure containers to secure memory 414, that is, verify that the containers have been mapped to respective portions of the secure memory.

With continued reference to FIG. 4, after validation and verification of the successful performance of the processes that make up the secure boot process, an audit log 416, which may also be referred to as a 'provenance artifact,' may be created that contains, for example, the list of processes that make up the secure boot process, and the results of the validation of each of those processes. In some embodiments, the audit log 416 may be created prior to validation of the processes in the DCF annotation stack 400, and the audit log 416 may then be updated after each validation of a process. An audit log 416 may likewise be created even where one or more of the processes in the DCF annotation stack 400 fails validation.

In any case, the audit log 416 may be time stamped and then stored as a provenance artifact in the secure memory of the node where the boot process took place. As also shown in FIG. 4, a node may include one or more containers 420 that are each mapped to a respective portion of a trusted DCF enclave 422, and the audit log 416 may be stored in the trusted DCF enclave 422. As discussed belove, the storage of the audit log 416 as a time-stamped provenance artifact can be accomplished in other ways as well. For example, and as discussed in more detail elsewhere herein, the provenance artifact may ultimately be stored in a target ledger along with the complete list of DCF annotations that were made by the node(s) that handled the data received from a data generator.

More generally, the time-stamped provenance artifact may be stored in a ledger instead of, or in addition to, being stored locally at the node as shown in FIG. 4. A ledger entry that includes the provenance artifact may be immutable and cryptographically secure. An approach involving storage of the provenance artifact at a remote ledger may enable a more granular level of forensic inspection of the provenance artifact, since storing a ledger entry may involve the invocation of additional security techniques, such as the use of a private key to create the ledger entry, and achievement of a consensus that the entry is valid before storing the entry into the ledger. That is, the provenance artifact may be subjected, in this approach involving the use of a ledger, to more in-depth scrutiny than if it were stored and inspected only locally at the node. Moreover, if the ledger approach were employed, each DCF container may not need to annotate the entirety of a provenance artifact received from another node. Instead, each DCF container may only store a pointer, or a hash of the provenance artifact, to the ledger entry(ies) made by the node(s) from which the provenance artifact was received.

Thus, the use of a ledger to store entries for each of a plurality of nodes implements a blockchain functionality in which the ledger entries are cryptographically secure and immutable. Thus, a ledger entry may comprise, for example, a provenance artifact demonstrating successful performance of a secure boot process performed by a first node, pointers to the provenance artifact of the first node and/or to annotations made by the first node to data transmitted by a data generator, and one or more annotations made by a second node that received that pointer from the first node. Thus, a given node downstream of a plurality of other nodes may receive, for example, pointers to the respective provenance artifacts of each those nodes, as well as pointers to the respective annotations made by each of those nodes. The immutable and cryptographically secure ledger entries may accordingly be relied upon by other nodes as being authentic and accurate.

In one alternative to the ledger approach for enabling reliable verification that secure boot processes have been performed by one or more nodes of a DCF, the provenance artifact of a node may be broadcast, in a peer-to-peer fashion for example, to other nodes in a data path of which the broadcasting nodes is a part. To illustrate, "Secure Boot Event" message may be sent to one or more nodes from a node that has successfully performed a secure boot process, such as a secure boot process defined by a DCF annotation stack for example. In some embodiments, any node of a DCF may broadcast its own provenance artifact and/or the provenance artifacts of the other nodes of the DCF.

Each node that receives the provenance artifact, which may serve as a signature, or fingerprint, that is unique to the broadcasting node, from the broadcasting node may keep that signature or fingerprint of the secure boot annotated in logs and passed along node-to-node. The receiving node may use the signature or fingerprint to verify that the broadcasting node has successfully performed a secure boot and, having done so, the receiving node may then pass that signature or fingerprint along to the next node in the hierarchy. The final node in the hierarchy may then create an entry in the ledger, and the entry may include all of the respective signatures, or fingerprints, of the nodes that have annotated the data as that data transited the DCF from the data generator to the final node. Thus, the ledger entry may comprise, for example, a group of signatures, pointers to annotations made by the various nodes, and the annotations made by the final node. This approach involving the use of a ledger may enable the performance of audits as to whether, or not, secure boot processes were successfully performed, and where/when those boot processes were performed. Such audits may also identify the particular nature of annotations that were made and where/when the annotations were made.

Figure 5:
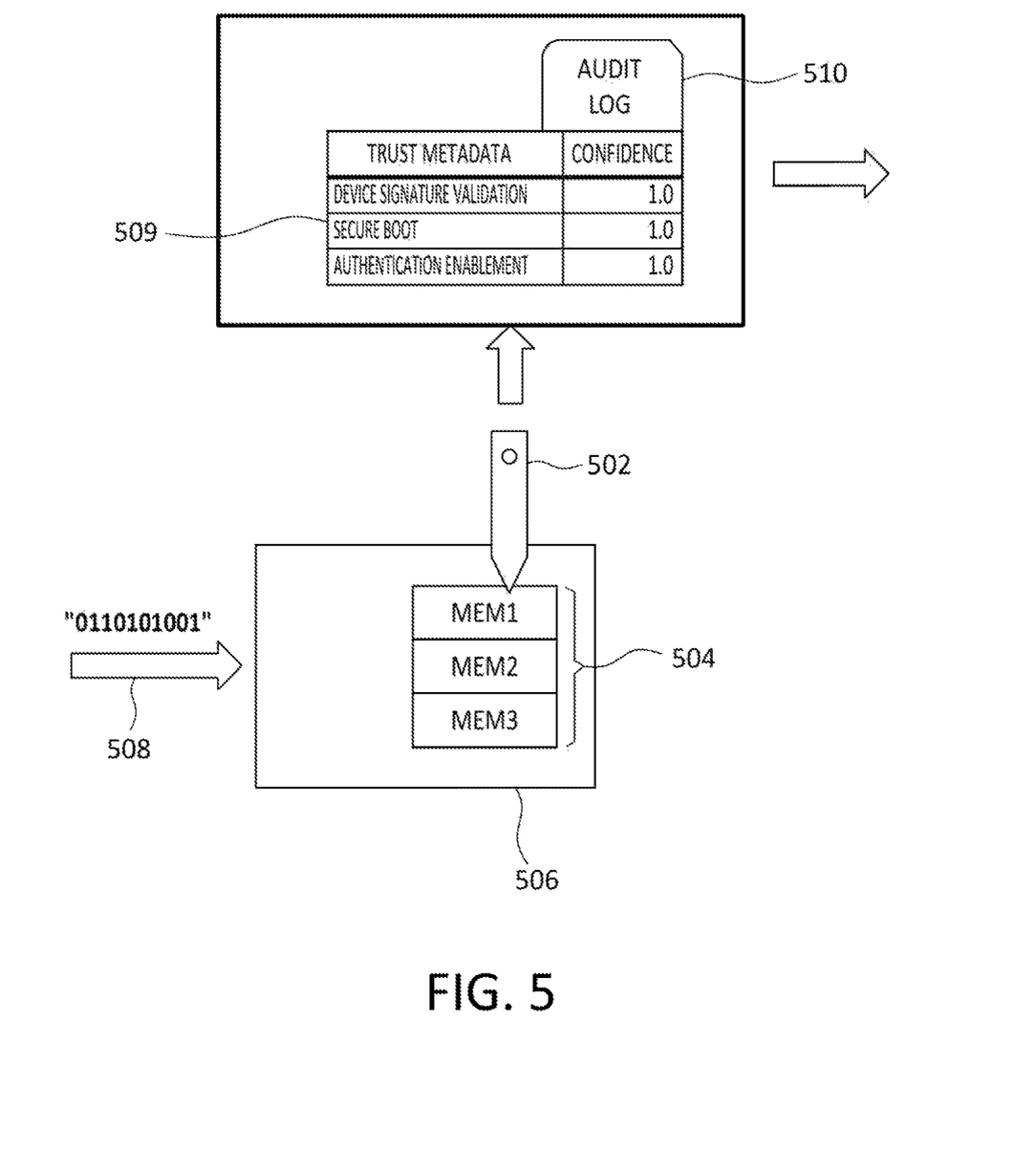
FIG. 5 discloses aspects of a scheme for secure annotation in a DCF.

With attention now to FIG. 5, details are provided concerning annotation from a secure DCF container, denoted in FIG. 5 at 502. As shown, the secure DCF container 502 may be stored in a protected memory portion, such as a secure enclave 504 for example, of a node 506. The secure enclave 504 may comprise multiple separate storage locations, such as Mem1, Mem2, and Mem3, for example. Once the node 506 has completed its secure boot process, transactions, such as data 508, may begin arriving at the node 506, which may comprise various other hardware components in addition to the secure enclave 504. Annotations may now be generated by the node 506 from within the context of the secure DCF container 502.

Particularly, in the example of FIG. 5, annotations may be implemented within the context of the trusted DCF container 502, as also noted in connection with FIG. 3. The annotations made by the node 506 may be captured in an annotation table 509, and the audit log 510 that includes the record of the secure boot process successfully performed by the node 506 may be included with the annotation table 509.

Both the annotation table 509 and audit log 510 or, alternatively, respective pointers to the annotation table 509 and audit log 510, may be inherited by the next node in the chain. This approach may enable the performance of audits as to whether, or not, secure boot processes were successfully performed, and where/when those processes were performed.

Figure 6:
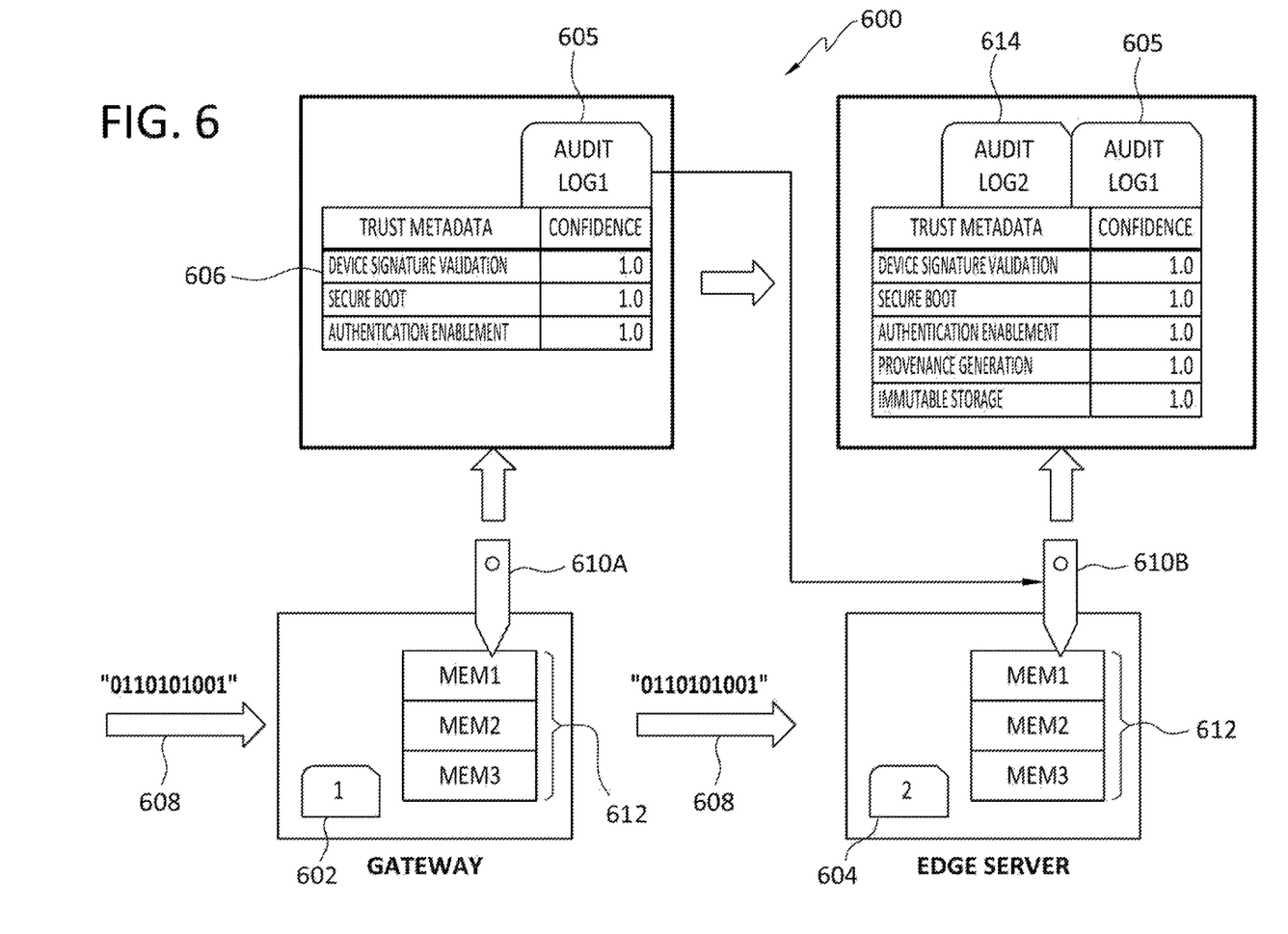
FIG. 6 discloses aspects of a scheme for inheritance validation in a secure DCF.

With attention now to FIG. 6, an example scheme 600 is presented for handling the trusted inheritance of DCF annotations. As noted earlier herein, a trusted DCF annotation stack at a node, such as nodes 602 and 604, may define a secure node boot process, and the performance of that boot process may be validated and recorded, such as in an audit log 605. As well, trust metadata 606, such as DCF annotations and scores concerning data 608 may be generated at one or more nodes, such as the nodes 602 and 604, using, for example, by DCF node software running in containers 610A and 610B stored in a secure storage environment 612. The provenance of the processes that make up the secure boot process defined by the trusted DCF annotation stack may also be included in the annotations. In general, and as discussed below, a successive node, such as node 604, in a chain of nodes may, in connection with the execution of inheritance logic at the node 604, leverage the data and metadata in the audit log 605, as well as the trust metadata 606.

In more detail, as the data 608 is being forwarded from the node 602 to the node 604, the provenance metadata 605 from the node 602 may be fed into the next secure container 610B in the chain, that is, the container 610B at the node 604. The container 610B may now have context, such as in the form of metadata, not available to the node 602, and may use that context to determine if the node 602 is trustworthy. As the node 604 adds its own annotations, such as Provenance Generation and Immutable Storage for example, the node 604 may also append the audit log 614 that was generated during its own secure boot process.

Figure 7:
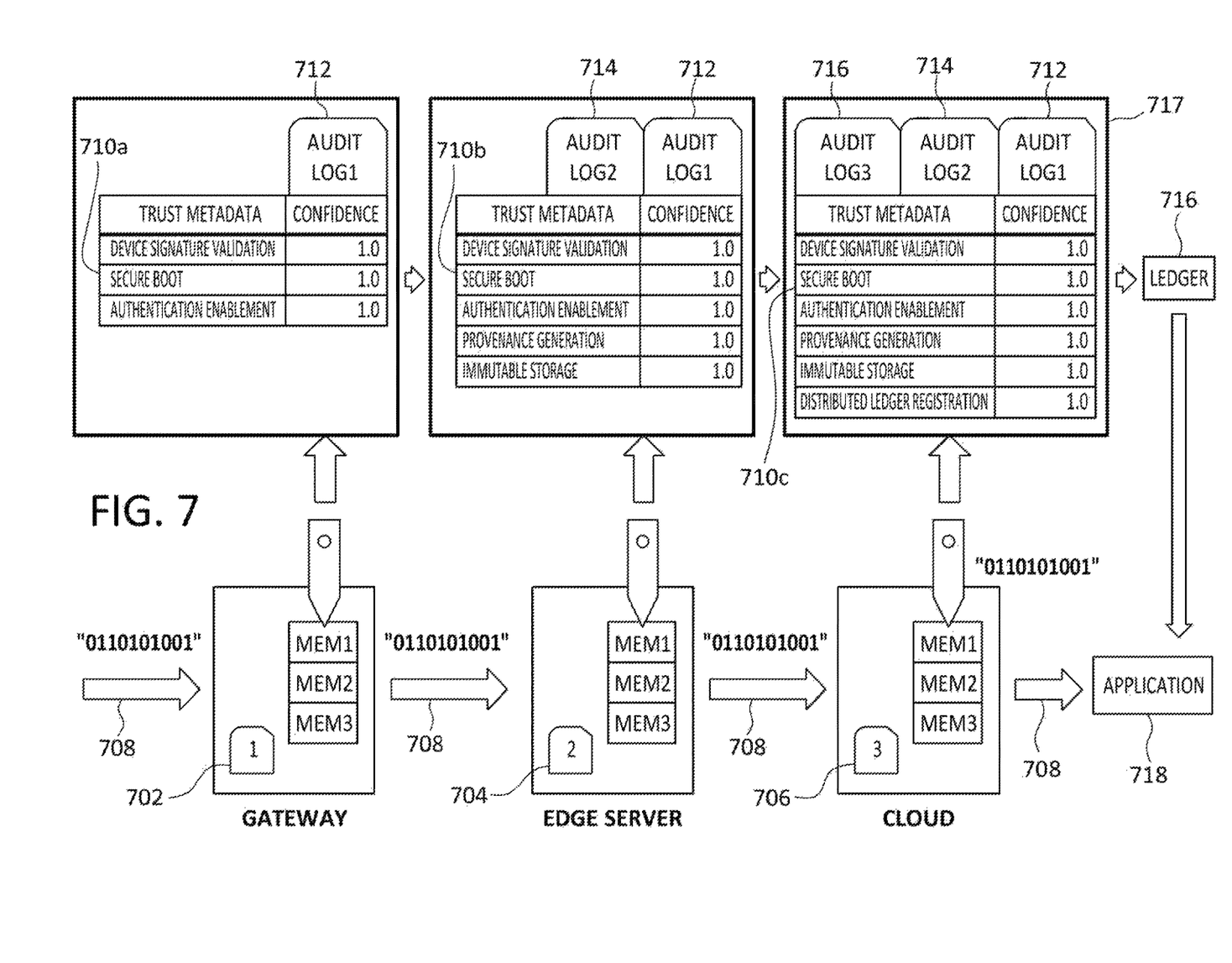
FIG. 7 discloses an example of secure enclave pathing configuration auditing.

As shown in FIG. 7, the scheme 600 and associated processes disclosed in FIG. 6 may be repeated in serial fashion for any number of nodes, ultimately culminating in creation of a cryptographically secure ledger entry stored in secure storage. In the example of FIG. 3, DCF nodes 702, 704, and 706, are disclosed that are able to communicate with each other, including passing data 708. Each node 702, 704, and 706, may also append respective trust metadata 710a, 710b, and 710c, to the data 708, and may also append respective audit logs 712, 714, and 716, to the data 708. As noted in the discussion of FIG. 6, the audit logs may continue to be accumulated as data, and accumulated trust metadata, make their way to the final node, that is, node 706. The configuration and arrangement of FIG. 7 may thus enable, among other things, historical auditability of full DCF pathing.

Particularly, FIG. 7 discloses the end result of data handling in a DCF in which all of the nodes 702, 704, and 706, that processed the data define respective portions of a secure enclave path extending from node 702 through node 706. The ledger entry 717 that is created by the node 706 and stored in the ledger 716, and that stores the final DCF metadata result, is not only available to an application 718, but the ledger entry 717 may also contain a history of the secure handling of the data 708 as it passed through the nodes 702, 704, and 706, of the DCF. Because the application 718 may have access to the ledger entry 717, the application 718 may deem the data 708 as trustworthy, based on the existence and use of the secure enclave path, and/or based on the content of the trust metadata 710a, 710b, and 710c, and audit logs 712, 714, and 716. Because the history of the secure handling of the data 708, as embodied by the ledger entry 717 for example, is an immutable, auditable record that cannot be deleted, that history may be used during a forensic exploration, that is, an audit, of the data 708 and any process directly or indirectly involving that data 708.

C. Example Methods

Figure 8:
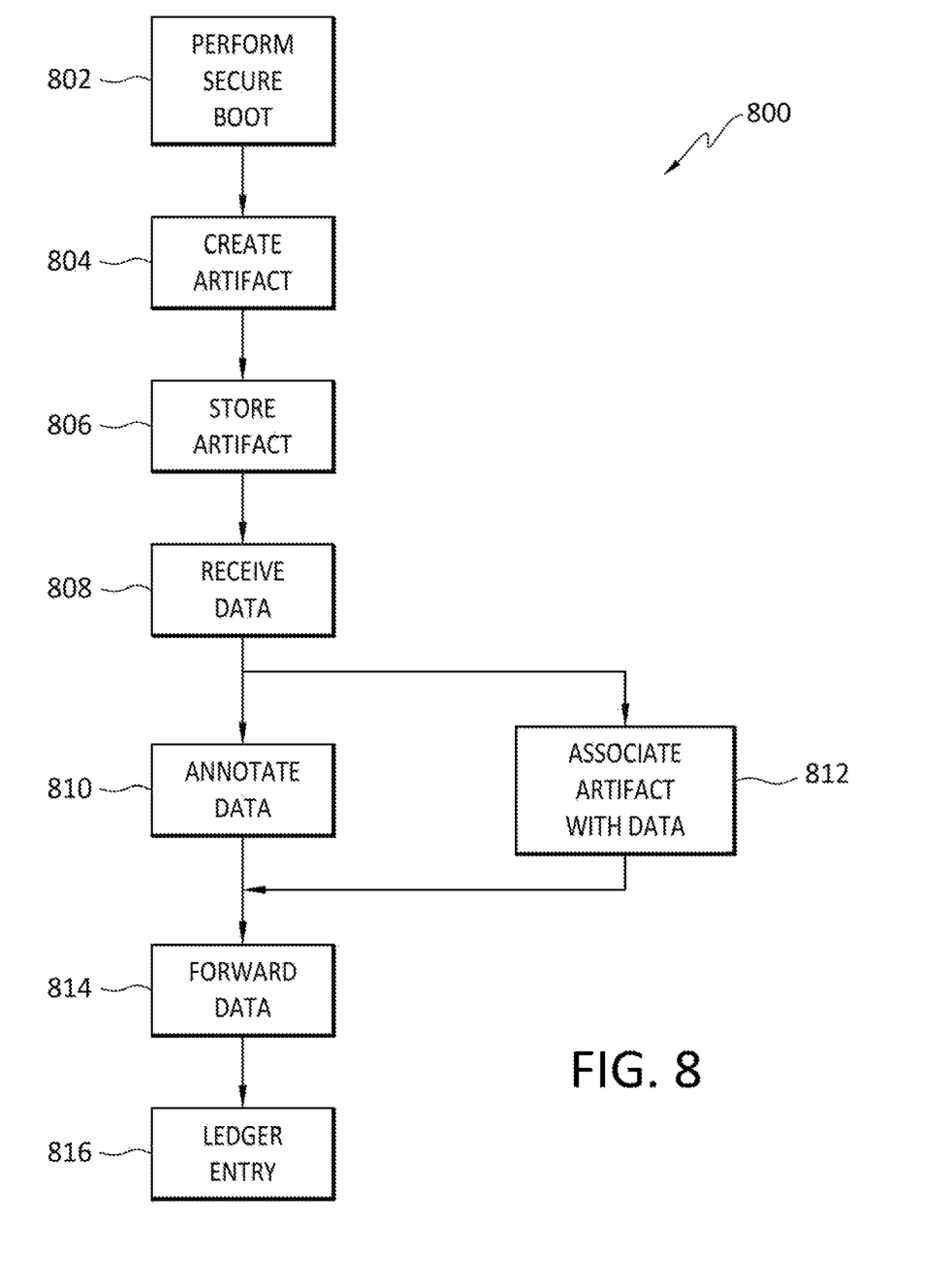
FIG. 8 discloses an example method for handling data in a DCF.

It is noted with respect to the example method of FIG. 8 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 8, an example method 800 is disclosed that may be performed, in whole or in part, by a node of a DCF. Particularly, the method 800 may be performed, in whole or in part, by DCF node software running on node hardware. In some instances, part or all of the method may be performed automatically. For example, the method 800 may begin automatically when node hardware is powered up, and other portions of the method may be performed automatically in response to receipt of data at the node, where the data may be received from a data generator, such as a sensor, and/or from another node.

The example method 800 may begin at 802 when a node of a DCF performs a secure boot process. The secure boot process may validate the performance of various processes that collectively define the secure boot process.

An artifact may then be created 804 by the node. The artifact may comprise an audit log that contains the result of respective validation processes for each act or process of the secure boot process. The artifact may be time stamped, and the artifact may include a unique identifier that associates the artifact with the node that generated it.

Next, the artifact may be stored 806. In some instances, the artifact may be stored 806 locally at the node, such as in a secure enclave at the node. In other instances, the artifact may be stored in a location remote from the node, such as at a ledger for example. When stored in a ledger, the artifact may be may be accessible, on a read-only basis, to one or more other nodes of the DCF. In still other instances, the artifact may be broadcast to one or more other nodes of the DCF. In this latter example, a copy of the artifact may also be retained locally at the node that generated the artifact, although that is not required. After the artifact has been stored and/or broadcast, the node may then be in a state to receive and process data.

Thus, a next portion of the method 800 may begin when data is received at the node 808 from a data generator, such as a sensor for example, or from another node. After receipt of the data 808, the data may be annotated 810 with trust metadata generated by DCF node software running on the node hardware. The trust metadata may be generated based a trustworthiness evaluation of the data by the DCF node software. Before, during, or after, annotation 810 of the data, the artifact may also be associated with the data 812.

In this way, when the data and artifact are transmitted 814 to an entity such as another node, the receiving entity has assurance that, at least, the node from which the data and artifact were received has successfully performed a secure boot process and can thus be trusted. Because the data that is transmitted 814 may also be annotated with trust metadata, a recipient of the data, such as an application and/or another node such as the receiving entity, or a final node, for example, may be able to assess the trustworthiness of the data.

The portion of the method 800 extending through 814 may be performed one or more times, such as in serial fashion, until the data, accumulated annotations, and accumulated artifacts are received at the final node, which may be in an uppermost tier of the DCF. The final node may then created a ledger entry 816 comprising the data, accumulated annotations, and accumulated artifacts. In some embodiments, the ledger entry may not contain actual annotations or artifacts, but only pointers to those respective elements, and the actual annotations and artifacts may be stored in one or more locations other than the ledger. The ledger entry may be accessible by an application and/or other user, which may then use the ledger entry as a basis for performing, or not performing, one or more operations with respect to the data with which the ledger entry is concerned.

Figure 9:
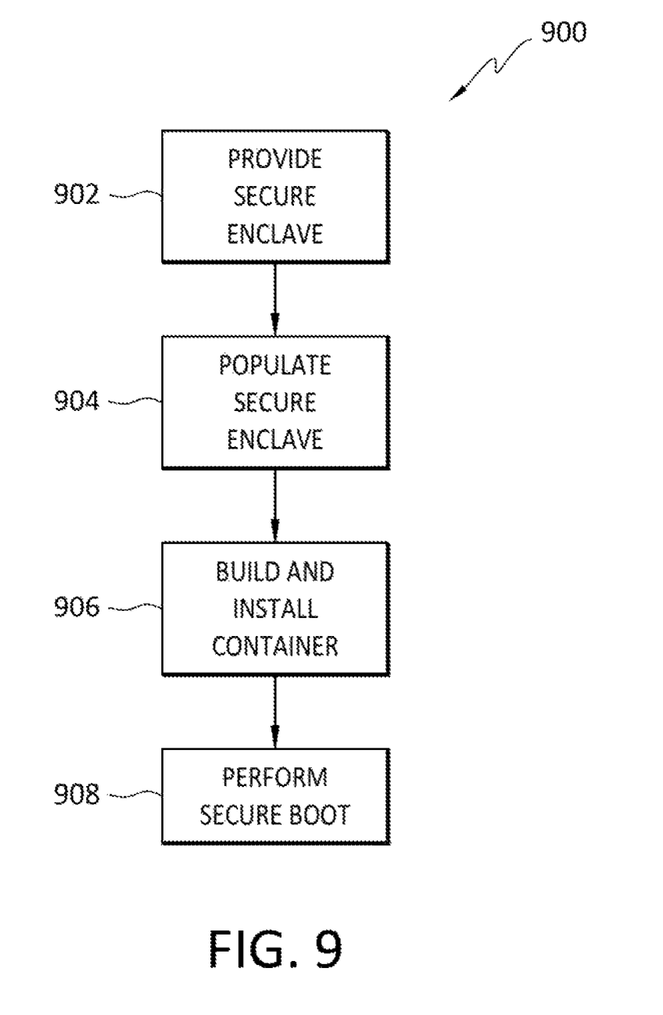
FIG. 9 discloses an example method for configuring a node to perform secure annotation and other processes.

With reference now to FIG. 9, an example method 900 is disclosed for configuring a node to perform operations relating to data, trust metadata annotations, and artifacts. The example method 900 may begin when a secure enclave, or protected memory space, is provided in node hardware, where the node hardware may be an edge server, or gateway, for example.

The secure enclave may then be populated 904 with logic that may be executed to perform, for example, processes such as data evaluation, and annotation of the data with trust metadata. Next, a container may be built and installed in the node hardware 906. In order to enable the container to access the logic in the secure enclave, a secure boot of the container may then be performed 908. Upon successful completed of the secure boot 908, the container may then, when data is received from another entity, access the secure enclave and run the logic.

D. Further Example Embodiments

Following are some further example embodiments of the invention. These are presented only by way of example and are not intended to limit the scope of the invention in any way.

Embodiment 1. A method, comprising: performing a secure boot of hardware at a node of a data confidence fabric; creating an artifact that includes information concerning the secure boot; storing the artifact; receiving, at the node, a data stream; annotating data of the data stream with trust metadata; and associating the artifact with the data.

Embodiment 2. The method as recited in embodiment 1, wherein the artifact is stored locally at the node.

Embodiment 3. The method as recited in any of embodiments 1-2, wherein the artifact is immutably stored in a ledger.

Embodiment 4. The method as recited in any of embodiments 1-3, wherein annotating the data is performed by logic retrieved by a container from a secure enclave at the node.

Embodiment 5. The method as recited in embodiment 4, wherein successful performance of the secure boot enables the container to access the logic in the secure enclave.

Embodiment 6. The method as recited in any of embodiments 1-5, further comprising creating a ledger entry that comprises a pointer to the data, a pointer to the artifact, and the trust metadata.

Embodiment 7. The method as recited in any of embodiments 1-6, wherein the artifact comprises an audit log that contains a record of performance and validation of processes of a trusted data confidence fabric annotation stack.

Embodiment 8. The method as recited in any of embodiments 1-7, further comprising receiving another artifact from another node of the data confidence fabric, and appending the another artifact to the artifact and the trust metadata.

Embodiment 9. The method as recited in embodiment 8, further comprising creating a ledger entry that comprises the artifact, the another artifact, a pointer to the data, and the trust metadata.

Embodiment 10. The method as recited in any of embodiments 1-9, further comprising broadcasting the artifact to another node of the data confidence fabric.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 10:
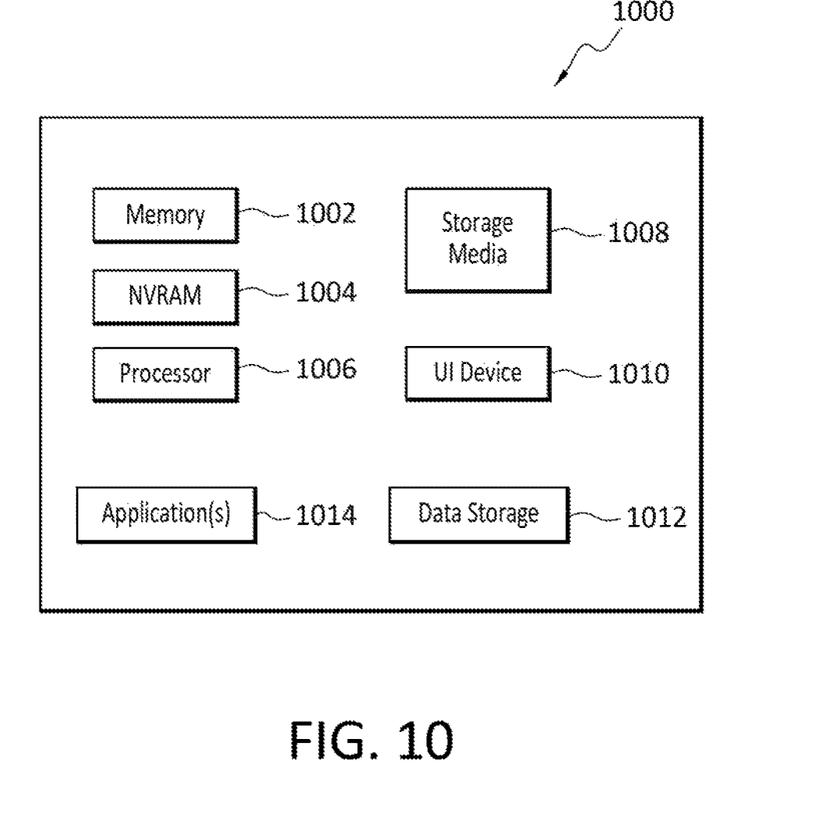
FIG. 10 discloses aspects of an example computing entity configured to perform any of the disclosed processes.

With reference briefly now to FIG. 10, any one or more of the entities disclosed, or implied, by FIGS. 1-9 and/or elsewhere herein, may take the form of, or include, or be implemented on, or hosted by, a physical computing device, one example of which is denoted at 1000. As well, where any of the aforementioned elements comprise or consist of a virtual machine (VM), that VM may constitute a virtualization of any combination of the physical components disclosed in FIG. 10.

In the example of FIG. 10, the physical computing device 1000 includes a memory 1002 which may include one, some, or all, of random access memory (RAM), non-volatile memory (NVM) 1004 such as NVRAM for example, read-only memory (ROM), and persistent memory, one or more hardware processors 1006, non-transitory storage media 1008, UI device 1010, and data storage 1012. One or more of the memory components 1002 of the physical computing device 1000 may take the form of solid state device (SSD) storage. As well, one or more applications 1014 may be provided that comprise instructions executable by one or more hardware processors 1006 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
performing a secure boot of hardware at a node of a data confidence fabric to access a protected memory space;
creating, by the node, an artifact that includes information concerning the secure boot;
storing the artifact in the protected memory space;
receiving, at the node, a data stream;
annotating data of the data stream with trust metadata the trust metadata including a plurality of individual trust metadata values, each one of the individual trust metadata values including a confidence score that specifies an overall trustworthiness of each individual trust metadata value; and
associating the artifact with the data so as to enable a downstream node, having received the trust metadata from the node, to verify, by accessing the artifact, that the trust metadata is authentic and accurate.

2. The method as recited in claim 1, wherein the artifact is stored locally at the node.

3. The method as recited in claim 1, wherein the artifact is immutably stored in a ledger.

4. The method as recited in claim 1, wherein annotating the data is performed by logic retrieved by a container from a secure enclave at the node.

5. The method as recited in claim 4, wherein successful performance of the secure boot enables the container to access the logic in the secure enclave.

6. The method as recited in claim 1, further comprising creating a ledger entry that comprises a pointer to the data, a pointer to the artifact, and the trust metadata.

7. The method as recited in claim 1, wherein the artifact comprises an audit log that contains a record of performance and validation of processes of a trusted data confidence fabric annotation stack.

8. The method as recited in claim 1, further comprising receiving another artifact from another node of the data confidence fabric, and appending the another artifact to the artifact and the trust metadata.

9. The method as recited in claim 8, further comprising creating a ledger entry that comprises the artifact, the another artifact, a pointer to the data, and the trust metadata.

10. The method as recited in claim 1, further comprising broadcasting the artifact to another node of the data confidence fabric.

11. A non-transitory storage medium having stored therein instructions that are executable by one or more hardware processors to perform operations comprising:
performing a secure boot of hardware at a node of a data confidence fabric to access a protected memory space;
creating, by the node, an artifact that includes information concerning the secure boot;

storing the artifact in the protected memory space;
receiving, at the node, a data stream;
annotating data of the data stream with trust metadata the trust metadata including a plurality of individual trust metadata values, each one of the individual trust metadata values including a confidence score that specifies an overall trustworthiness of each individual trust metadata value; and
associating the artifact with the data so as to enable a downstream node, having received the trust metadata from the node, to verify, by accessing the artifact, that the trust metadata is authentic and accurate.

12. The non-transitory storage medium as recited in claim 11, wherein the artifact is stored locally at the node.

13. The non-transitory storage medium as recited in claim 11, wherein the artifact is immutably stored in a ledger.

14. The non-transitory storage medium as recited in claim 11, wherein annotating the data is performed by logic retrieved by a container from a secure enclave at the node.

15. The non-transitory storage medium as recited in claim 14, wherein successful performance of the secure boot enables the container to access the logic in the secure enclave.

16. The non-transitory storage medium as recited in claim 11, wherein the operations further comprise creating a ledger entry that comprises a pointer to the data, a pointer to the artifact, and the trust metadata.

17. The non-transitory storage medium as recited in claim 11, wherein the artifact comprises an audit log that contains a record of performance and validation of processes of a trusted data confidence fabric annotation stack.

18. The non-transitory storage medium as recited in claim 11, wherein the operations further comprise receiving another artifact from another node of the data confidence fabric, and appending the another artifact to the artifact and the trust metadata.

19. The non-transitory storage medium as recited in claim 18, wherein the operations further comprise creating a ledger entry that comprises the artifact, the another artifact, a pointer to the data, and the trust metadata.

20. The non-transitory storage medium as recited in claim 11, wherein the operations further comprise broadcasting the artifact to another node of the data confidence fabric.

* * * * *